United States Patent [19]
Burges et al.

[11] Patent Number: 5,647,027
[45] Date of Patent: Jul. 8, 1997

[54] METHOD OF IMAGE ENHANCEMENT USING CONVOLUTION KERNELS

[75] Inventors: Christopher John Burges, Freehold; Eric Cosatto, Highlands; Hans Peter Graf, Lincroft, all of N.J.

[73] Assignee: Lucent Technologies Inc., Murray Hill, N.J.

[21] Appl. No.: 330,885

[22] Filed: Oct. 28, 1994

[51] Int. Cl.$^6$ ............................ G06K 9/40; G06K 9/00; G06K 9/56

[52] U.S. Cl. ..................... 382/275; 382/101; 382/205; 382/254; 382/279

[58] Field of Search .................... 382/257, 260, 382/264, 275, 279, 101, 102, 258, 205, 209, 266, 210, 254, 263

[56] References Cited

U.S. PATENT DOCUMENTS

| | | | |
|---|---|---|---|
| 4,984,286 | 1/1991 | Dolazza | 382/263 |
| 5,027,419 | 6/1991 | Davis | 382/28 |
| 5,054,102 | 10/1991 | Gaborski | 382/258 |
| 5,081,692 | 1/1992 | Kwon et al. | 382/275 |
| 5,138,695 | 8/1992 | Means et al. | 382/278 |
| 5,202,933 | 4/1993 | Bloomberg | 382/257 |
| 5,212,741 | 5/1993 | Barski et al. | 382/267 |
| 5,216,725 | 6/1993 | McCubbrey | 382/257 |
| 5,220,614 | 6/1993 | Crain | 382/34 |
| 5,224,176 | 6/1993 | Crain | 382/1 |
| 5,392,137 | 2/1995 | Okubo | 358/462 |
| 5,392,365 | 2/1995 | Steinkirchner | 382/260 |
| 5,521,985 | 5/1996 | Camp, Jr. et al. | 382/210 |

FOREIGN PATENT DOCUMENTS

| 1210870 | 9/1986 | Canada . |
|---|---|---|

OTHER PUBLICATIONS

A. Rosenfeld et al, "Digital Picture Processing", vol. 1 and 2, Academic Press, Orlando, 1982.

A. N. Netravalli, et al., "Digital Pictures",Plenum Press, New York, 1988.

Henk, J. A. M. Heijmans, "Morphological Image Operators," Acedemic Press, Boston, 1994.

I. Pitas, et al., "Nonlinear Digital Filters," Kluwer Academic Publishers, Boston, 1990.

W. K. Pratt, "Digital Image Processing," John Wiley & Sons, New York, 1991.

B. R. Meijer, "Rules and algorithms for the design of templates for template matching," Proc. 11th IAPR Int. Conf. on Pattern Recognition, vol. 1, Conf. A: Computer Vision and Applications, IEEE Computer Society Press, Los Alamitos, CA (1992) pp. 760–763.

H. P. Graf, et al., "Address Block Location with a Neural Net System," Neural Information Processing Systems 6, Morgan Kaufmann, San Francisco (1994), pp. 785–792.

H. P. Graf, et al., "Image Recognition with an Analog Neural Net Chip," Proc. 11th IAPR 4 (1992) pp. 11–14.

H. P. Graf, et al., "A Recognfigurable CMOS Neural Network," Digest IEEE Int. Solid State Circuits Conf., (1990), pp. 144–145.

H. P. Graf, et al., "Reconfigurable Neural Net Chip with 32K Connections," Neural Information Processing Systems 3, J. E. Moody and D. S. Touretzky, Eds., Morgan Kaufmann, San Mateo, CA (1991), pp. 1032–1038.

E. Cosatto, et al., "NET32K High Speed Image Understanding System," Proc. Fourth International Conference on Microelectronics for Neural Networks and Fuzzy Systems, Sep. 26–28, 1994, IEEE Computer Society Press, Los Alamitos, CA (1994), pp. 413–421.

(List continued on next page.)

*Primary Examiner*—Leo Boudreau
*Assistant Examiner*—Bhavesh Mehta
*Attorney, Agent, or Firm*—Martin I. Finston

[57] ABSTRACT

Noisy images of graphical or pictorial records, such as hand-written postal addresses, are cleaned by a method of analyzing the shapes of pixel clusters. According to such method, a set of structuring kernels is used to extract primitive shapes. The outcome of this extraction process is used to determine whether each pixel, in turn, is to be treated as part of a image element such as an alphanumeric character.

21 Claims, 13 Drawing Sheets

OTHER PUBLICATIONS

R. Hummel, et al., "Computational Considerations in Convolution and Feature-extraction in Images," From Pixels to Features, J. C. Simon ed., Elsevier Science Publishers B. V., North Holland, (1989), pp. 91–102.

R. P. Loce, "The Use of First-Order Structuring-Element Libraries to Design Morphological Filters," Proceedings of 11th IAPR International Conference on Pattern Recognition, Aug. 30–Sep. 3, 1992, vol. III, Conference C: Image, Speech, and Signal Analysis, pp. 256–259.

V. P. Concepcion, et al., "Using morphology and associative memories to associate salt-and-pepper noise with OCR error rates in document images," Proceedings of SPIE – The International Society for Optical Engineering, vol. 1661.

| Direct | Day | 2 | .47 |
| --- | --- | --- | --- |
| Direct | Day | 2 | .53 |
| Direct | Day | 3 | .57 |
| Direct | Day | 2 | .65 |
| Direct | Day | 3 | .57 |
| Direct | Day | 2 | .35 |
| Direct | Day | 4 | .73 |
| Direct | Day | 3 | .66 |
| Direct | Day | 2 | .41 |
| Direct | Day | 3 | .57 |
| Direct | Day | 4 | .97 |

*continues*

*FIG. 10*

| Direct | Day | 2 | .47 |
| --- | --- | --- | --- |
| Direct | Day | 2 | .53 |
| Direct | Day | 3 | .57 |
| Direct | Day | 2 | .65 |
| Direct | Day | 3 | .57 |
| Direct | Day | 2 | .35 |
| Direct | Day | 4 | .73 |
| Direct | Day | 3 | .66 |
| Direct | Day | 2 | .41 |
| Direct | Day | 3 | .57 |
| Direct | Day | 4 | .97 |

*continues*

FIG. 12

METHOD OF IMAGE ENHANCEMENT USING CONVOLUTION KERNELS

FIELD OF THE INVENTION

This invention relates to the computational processing of pixel images to remove noise and undesired graphical elements. It can also be used to enhance the appearance of poorly printed characters and drawings. More particularly, the invention relates to the use of these processes to provide enhanced images that are useful for automatic functions such as machine reading of characters or the automatic interpretation of drawings.

BACKGROUND OF THE INVENTION

Many conventional optical character readers (OCRs) can reliably read machine-printed text if the text is printed cleanly and the page layout is relatively free of clutter. However, OCR performance is often degraded significantly by noisy images and poor print quality. One significant kind of noise is background texture, such as random speckle. For example, we have encountered especially severe noise problems in cases where the addresses on postal items were binarized for electronic transmission. Commercial OCR systems are unable to process such noisy images effectively. As a consequence, a large percentage of the mail stream has to be sorted manually even when OCR processing is used.

Often an image of a text page contains graphical elements that make an automatic analysis more difficult or prevent it completely. For example, often text is written in tables where the rows and columns are separated by lines. Often these line touch or cross the text, due to poor alignment of the writing. With lines crossing the text, it becomes very difficult to separate the text into individual characters and hence automatic processing becomes unreliable. The invention provides a technique to distinguish between different shapes and hence to distinguish which pixels belong to text and which to other graphical elements such as thin lines. In this way, thin lines can be identified and removed from the image before an OCR system is attempting to read it.

Numerous filtering techniques have been described for improving the quality of images. These techniques are described, for example, in the following publications, which are hereby incorporated by reference: A. Rosenfeld and A.C. Kak, *Digital Picture Processing*, Vols. 1 and 2, Academic Press, Orlando, 1982; A. N. Netravalli and B. C. Haskell, *Digital Pictures*, Plenum Press, New York, 1988; Henk J. A. M. Heijmans, *Morphological Image Operators*, Academic Press, Boston, 1994; I. Pitas and A.. Venetsanopoulos, *Nonlinear Digital Filters*, Kluwer Academic Publishers, Boston, 1990; and W. K. Pratt, *Digital Image Processing*, John Wiley & Sons, Ne York, 1991.

For example, techniques such as bandpass filtering can be used to suppress noise. However, these techniques are global in the sense that they treat every pan of the image in the same way. They are not adapting to suppress the kind of noise having a locally averaged level that varies from place to place over the image. Such variations may include, for example, variations in background level, image darkness, and damage, as well as variations in background texture. Other techniques, such as morphological operations (see, e.g., Henk J.A.M. Heijmans, "Morphological Image Operators, " cited above) are often used to reduce the level of noise. However morphological operations simply remove all image elements that are smaller than a certain size. Often the noise is comparable in size or larger than the characters or graphical elements of interest and hence these techniques do not provide the desired effect.

Other techniques are based on simple image parameters. An exemplary technique of this kind eliminates connected components of specified sizes. However, a parameter-based technique may not be robust enough to perform as well as is desired for at least some practical applications. One such application is the recognition of characters formed by dot-matrix printers. Each of the dots that make up such a character will, in some cases, be commensurate with the surrounding noise speckles. In such a case, robust discrimination can only be achieved by testing a neighborhood comparable in size to a character. Only in such a case can a confident judgment be made whether a given pixel belongs to the character, or to the noisy background.

One way to extract information about an input image is to convolve it with a convolution kernel. When several kernels are used in this way, logical operations or arithmetic operations can be used to assemble cumulative information from the respective convolution operations.

For example, a method for edge detection that uses a pair of complementary convolution kernels is described in B. R. Meijer, "Rules and algorithms for the design of templates for template matching," *Proc. 11th IAPR Int. Conf. on Pattern Recognition*, Vol. 1, Conf. A: Computer Vision and Applications, IEEE Computer Society Press, Los Alamitos, Calif. (1992) 760–763. This method detects image contours by using binary multiplication (the AND operation) to combine the output of a kernel that, e.g., detects a given pixel only when it is black, with the output of a kernel that detects neighbors of a given pixel only when they are white. This method is of limited use for enhancing noisy or complex images, because it only deals with edge information, and does not incorporate any detailed knowledge of the shape information that is expected to be present.

SUMMARY OF THE INVENTION

We have invented an image-enhancement technique based on the use of a set of structuring kernels to analyze the neighborhood of each pixel of the image. In this manner, we can characterize the shape of each cluster of pixels. Our technique can be made highly robust by using relatively large kernels, and by including kernels that detect various image characteristics.

According to our technique, a raw, pixel image is separately convolved with each of a plurality of convolution kernels. The output of each of these convolution operations is referred to as a respective "feature map."Some or all of the feature maps are then subjected to an addition operation, which produces a pattern referred to as a "template."

In some cases, the template will by itself constitute a useful, corrected image. In other cases, it will be desirable to correct the raw image by compounding it with the template in a suitable multiplication operation.

Significantly, at least two of the feature maps used to produce the template are selected to represent primitive shapes, or other primitive features, that are known to inhere in the raw image.

BRIEF DESCRIPTION OF THE DRAWING

FIG. 10 is an example of a table having horizontal lines that can be removed by an application of the invention, in one embodiment.

FIG. 12 is a cleaned image derived from the image of FIG. 10 and the template of FIG. 11, according to the invention in one embodiment.

DETAILED DESCRIPTION

Figure 1:
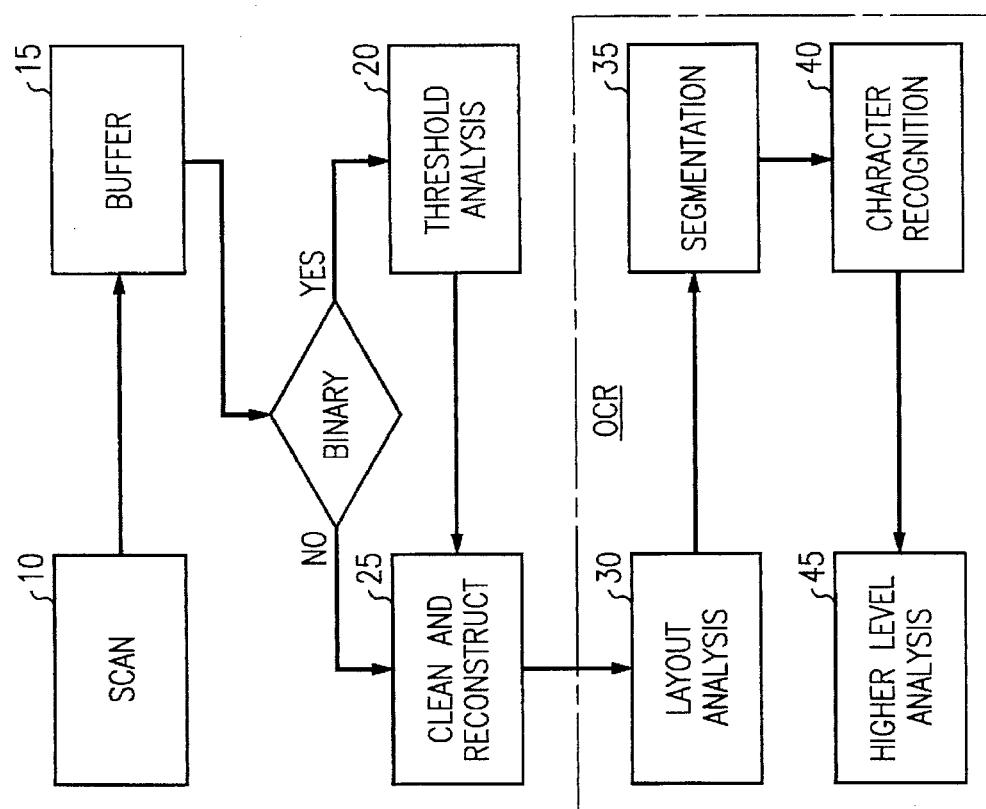
FIG. 1 is a flowchart illustrating a general approach to the problem of the automatic reading of graphical information.

FIG. 1 depicts a general approach to the problem of automatic reading of graphical information. This is one field in which the invention is advantageously applied. In box 10 of the FIG., input records, which are, for example, address-bearing postal items, are scanned by, e.g., the line camera component of a commercially available high-speed scanner. Using mechanical transport devices, these scanners can process, typically, seven records per second. Image information is sent to buffer 15.

If the subsequent Cleaning and Reconstruction step 25 will require binarized input, the image information may first be subjected to Threshold Analysis 20. It should be noted, however, that the methods for Cleaning and Reconstruction to be described below are generally applicable to continuously valued (i.e., gray-scale or color-scale) as well as to binary-valued input.

The processing steps that follow step 25 are labeled in the FIG. as "Optical Character Recognition (OCR)" steps. These include Layout Analysis 30, in which, for example, address blocks are set off from the rest of the graphical record, Segmentation 35, in which, for example, words are broken into individual letters, Character Recognition 40, and further steps in which Higher Level Analysis is embodied (represented as box 45). (It should be noted that step 30 is often regarded as preceding, rather than belonging to, the "OCR" processes.)

Figure 2:
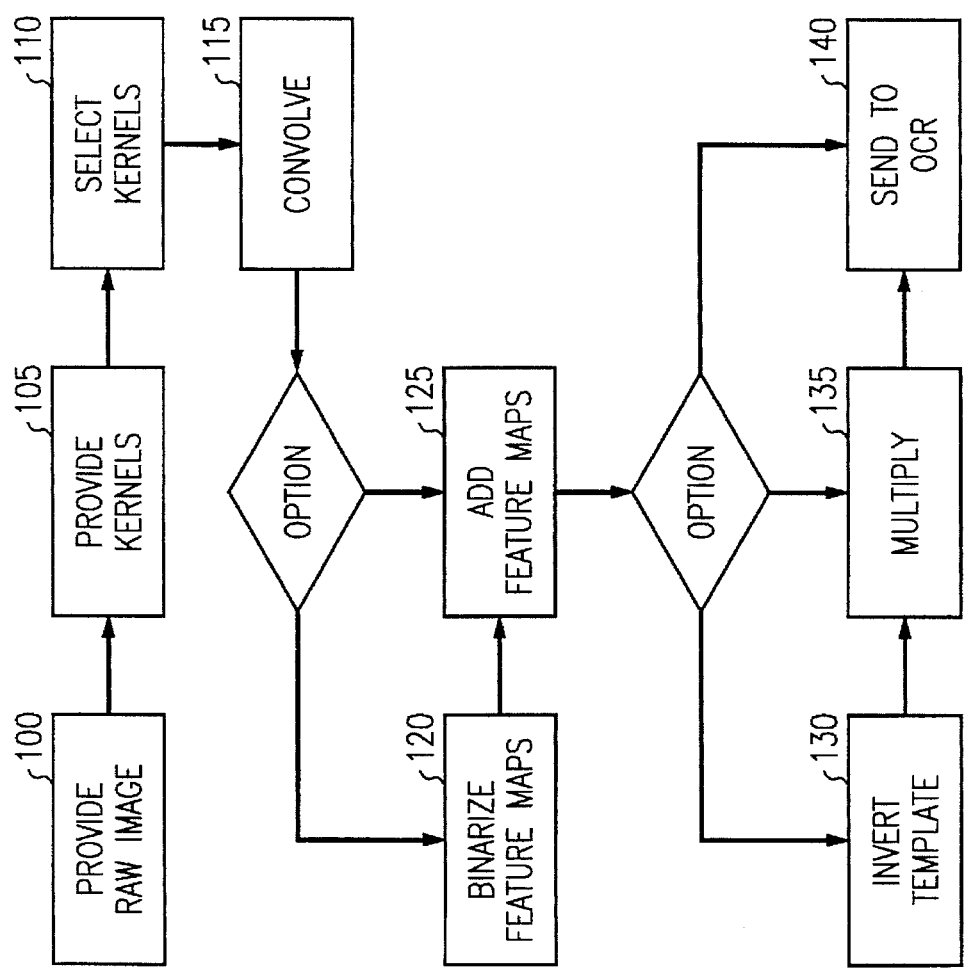
FIG. 2 is a flowchart illustrating certain aspects of the cleaning and reconstruction of graphical records, according to the invention in one embodiment.

The Cleaning and Reconstruction box is further subdivided in FIG. 2. The steps represented in that FIG. include step 100 of providing the raw image, typically from the buffer as described above. This step is followed by step 105 of providing a library of convolution kernels, and step 110 of selecting at least two kernels, each of which is convolved with the raw image, in step 115, to produce a respective feature map. If subsequent processing requires binary-valued feature maps, the feature maps are subjected to binarization operation 120.

The feature maps are subsequently combined in an appropriate addition operation 125 to form a template. The template, or, optionally, the product of further operations involving the template, is sent, in step 140, for further OCR processing. Prior to step 140, the template may be multiplied, according to a suitable multiplication operation 135, with the raw image to produce a corrected image. A further option is to invert, in step 130, the logical value of each (binary-valued) pixel in the template prior to step 135.

All of the Cleaning and Reconstruction process steps are readily performed using an appropriately programmed digital computer. However, it may be faster, and thus advantageous, to perform the convolution operations, the addition operations, and even the multiplication operations using special-purpose, hardwired computational devices such as the NET32K processor discussed below.

Specific, illustrative implementations of these processing steps are described in detail below.

According to some embodiments of the invention, the feature maps are binary valued. In those embodiments, the addition operation is advantageously a logical operation carded out such that each pixel of the resulting template is ON if the corresponding pixel of any of the feature maps is ON.

In those embodiments in which the raw image and the template have binary values, the multiplication operation is also advantageously a logical operation. That is, each pixel of the resulting, corrected image is ON only if the corresponding pixel is ON in both the raw image and the template.

The inventive technique will be useful for enhancing both graphical and pictorial images, and can be used to enhance both binary and gray-scale images. The set of kernels advantageously includes at least two, and preferably includes at least four, kernels for detecting primitive features of the raw image. Each kernel "represents" a primitive feature, i.e. a simple graphical element consisting of a number of pixels. Relatively large convolution values will appear in the neighborhood where such a feature is present in the raw image. By way of example, a primitive feature may be a short line segment of a certain orientation and thickness. The kernels may have binary or non-binary (e.g., gray scale) values.

Several factors influence the optimal size of a kernel. The kernel should be small enough to be somewhat invariant to scale, but large enough to be somewhat invariant to rotation and relatively insensitive to noise. (The desirable degree of rotation and scale invariance will depend, of course, on the specific application. For enhancement of hand-written records, this degree will depend on the variability of the human handwriting that is provided as input.)

Moreover, if image noise is statistically independent from pixel to pixel, the theoretical signal-to-noise ratio (i.e. the maximum value of the convolution at the position of a feature, divided by the value of the convolution at a place where only noise is present) is proportional to the square root of the total pixel count in the kernel. (In this argument, only the kernel values different from 0 give a contribution; the kernel pixels set to zero do not give a contribution.) Thus, considerations of noise may militate for larger kernels. However, for some kernels, we have also found that setting the kernel size to the size of the character (or other shape element of the image) affords the greatest signal-to-noise ratio.

For enhancing alphanumeric characters in a binarized, raw image, we currently prefer to use sets of eight or sixteen different kernels. Each of these illustrative kernels is composed of binary-valued pixels, and is adapted to detect a particular primitive shape. (By "primitive shape" is meant a primitive feature directly related to the appearance of an image element, such as a stroke of an alphanumeric character. It should be noted that kernels can also be selected to represent other primitive features, such as topological properties of image elements.)

Figure 3:
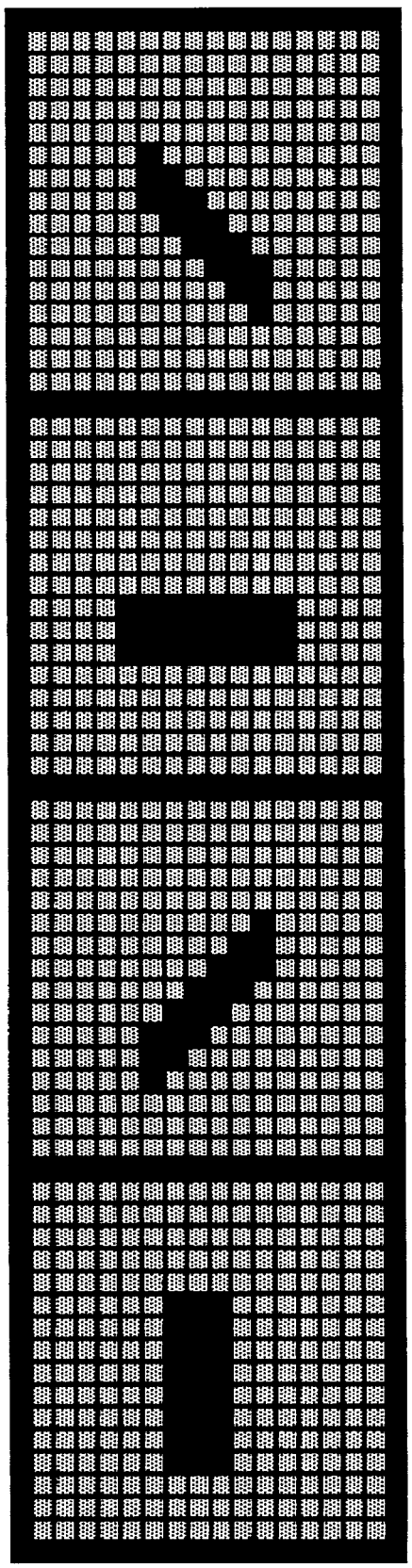
FIG. 3 is a collection of convolution kernels useful in practicing certain embodiments of the invention.

Our currently preferred sixteen primitive shapes consist of short line segments of four orientations: horizontal, vertical, diagonal at +45 degrees, and diagonal at −45 degrees. Corresponding to each of these orientations is a set of four kernels, each of a different size. These kernels are depicted in FIG. 3. The respective sizes are adapted to the sizes of characters expected in the image. If the four sets of kernels cannot cover the whole range of sizes, the image is convolved twice, with the image resized for the second pass. For example, for the second convolution, we may down-sample the image by a factor of four.

Each convolution will have its greatest value when all of the ON pixels of the kernel overlie ON pixels of the raw image. (ON pixels may, alternatively, be thought of as "black" or "1" pixels.) In effect, the convolution is performed by scanning the kernel in a raster pattern over the m rows and n columns of the raw image in increments of one pixel. At each relative position within this raster pattern, the convolution value is computed by taking the product of each kernel pixel with the underlying raw image pixel, and summing all of these products. For this purpose, each ON pixel has the value 1, and each OFF pixel has the value 0. The current sum is assigned to that pixel of the resulting m×n feature map that corresponds, in location, to a reference position such as the current center of the kernel. (The border regions where the kernel only partially overlaps the raw image are either discarded, or used with one of several correction techniques that are well-known in the art.)

In accordance with the binary character of this exemplary procedure, each of the resulting feature maps is binarized with reference to a suitable threshold Θ. That is, each pixel value $f_{ij}$ of the raw feature map is set to 1 in the binarized feature map if $f_{ij}$ >Θ, and set to 0 otherwise. Some or all of the feature maps are overlaid with a logical OR operation, as described above, to produce the template. That is, whenever a pixel is ON in any of the overlaid feature maps, it is set to ON in the template.

Figure 4:
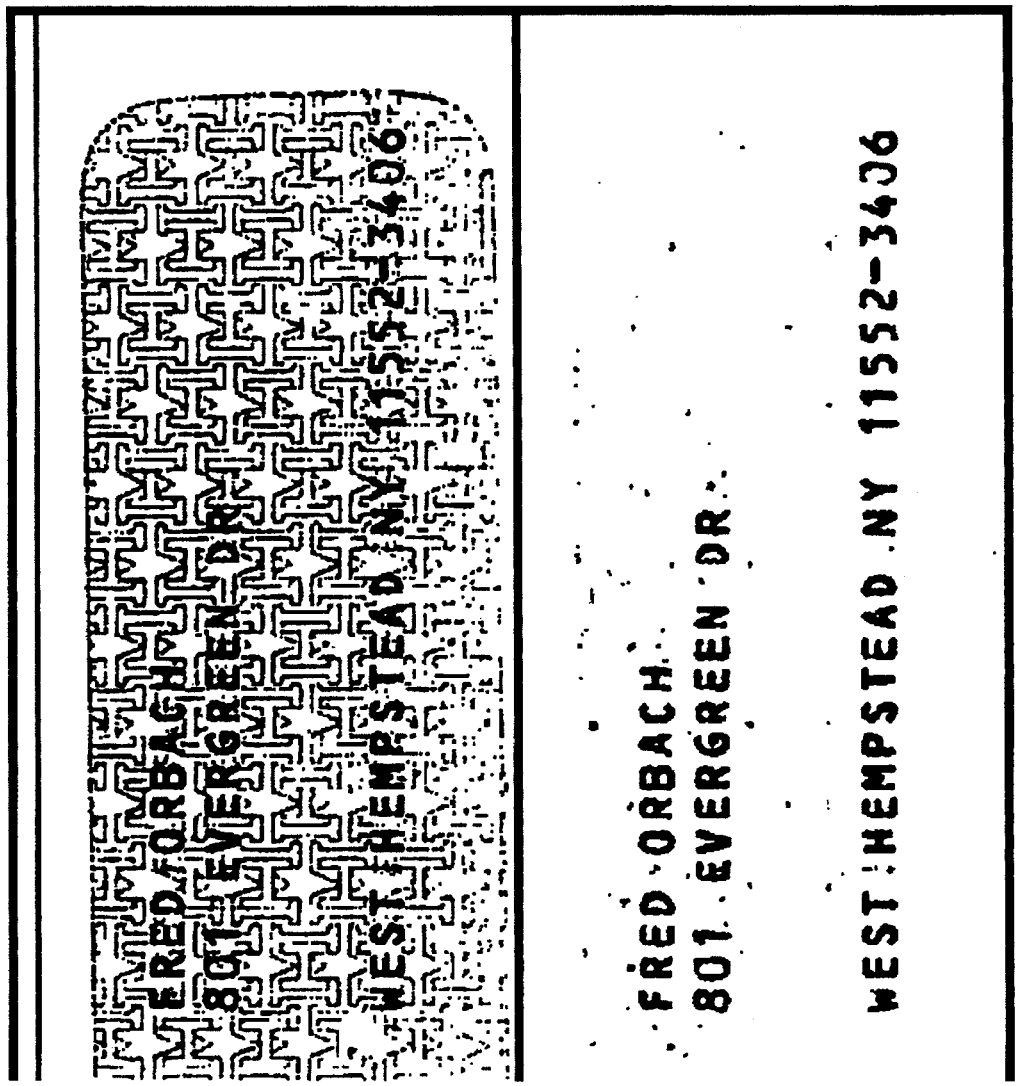
FIGS. 4 and 5 illustrate the cleaning of noisy images, according to the invention in one embodiment.
Figure 5:
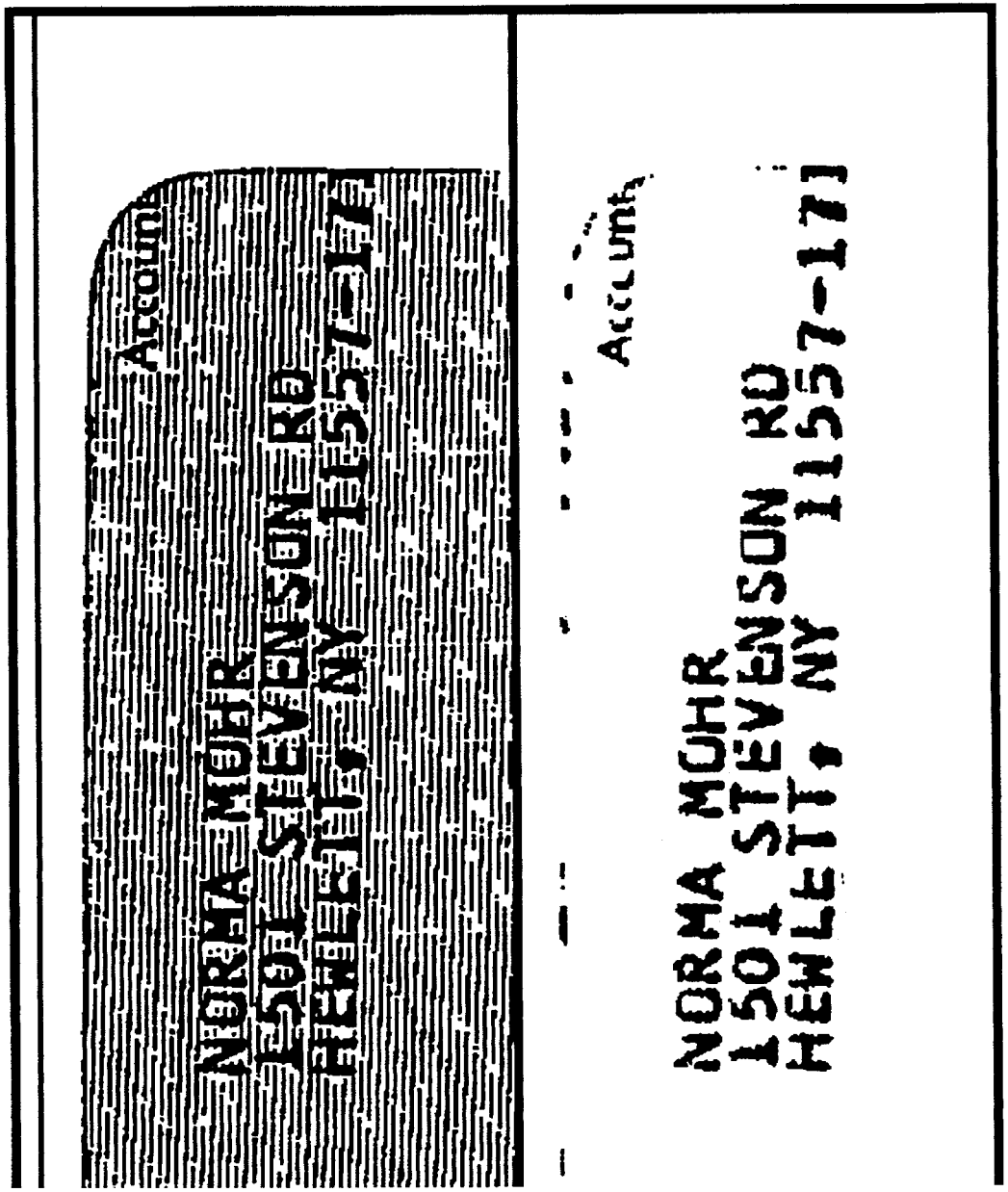

As noted above, the corrected image is then produced by overlaying the template onto the raw image with a logical AND operation. According to this operation, each ON pixel of the raw image is mapped to a corresponding ON pixel only if the corresponding template pixel is ON. Otherwise, that pixel of the raw image is mapped to an OFF pixel of the corrected image. We have found that this procedure generally results in excellent cleaning of noisy images, as illustrated, for example, in FIGS. 4 and 5.

Figure 5A:
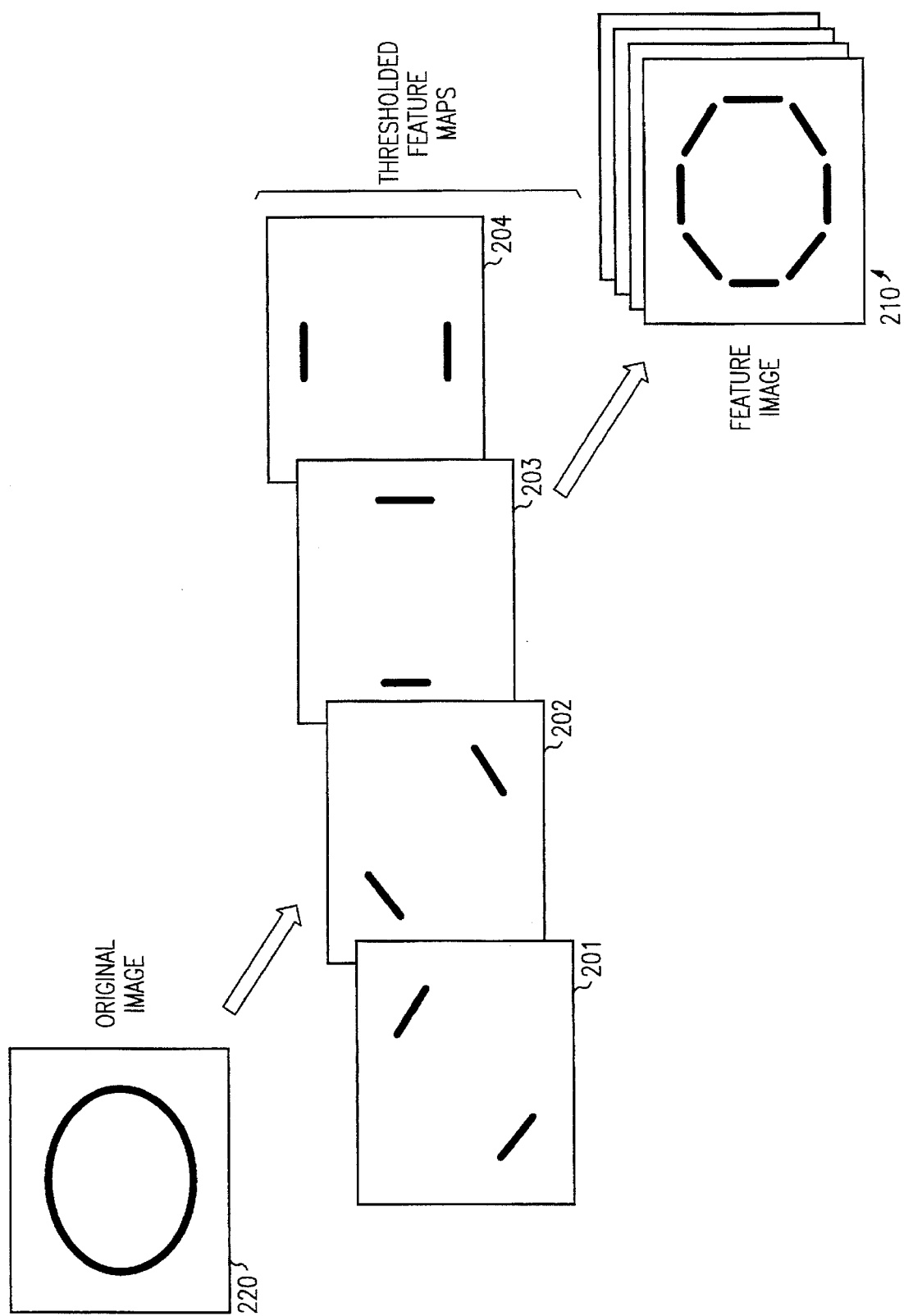
FIG. 5A depicts the logical combination of four thresholded feature maps 201–204 to produce a template 210 for enhancing an illustrative circular image 220.
Figure 5B:
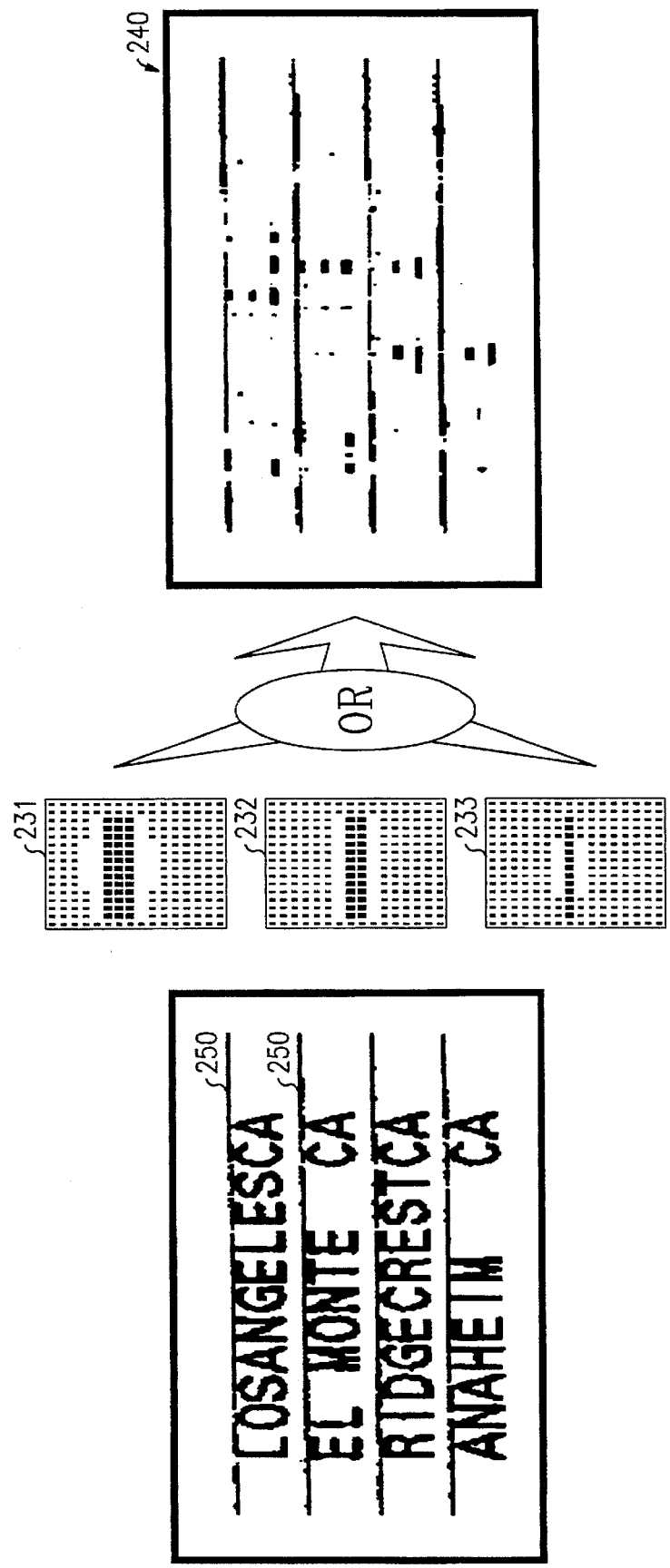
FIG. 5B depicts the logical combination of the feature-map outputs from three horizontal line-segment kernels 231–233 of varying widths. The resulting template 240 is useful for, e.g., removing undesired horizontal lines 250 from the address fields of postal items.

FIG. 5A depicts the logical combination of four thresholded feature maps to produce a template for enhancing an illustrative circular image. FIG. 5B depicts the logical combination of the feature-map outputs from three horizontal line-segment kernels of varying widths. The resulting template is useful for, e.g., removing undesired horizontal lines from the address fields of postal items.

We have found that the optimum value of Θ varies, depending on the level of noise in the raw image. An optimal value can generally be determined by a human operator with minimal experimentation. Additionally, we have found automatic methods for setting Θ to be useful.

According to a useful procedure for optimizing the threshold Θ, we first determine the result of the convolution as a function of the threshold. This function usually exhibits stationary behavior around the optimal value. Thus, by analyzing the threshold response function, the practitioner can readily find a good value for the threshold.

This technique can be applied locally, i.e., different thresholds can be set for different parts of the image. In most of our applications, however, a single threshold for the whole image was found to be adequate.

We have also found that the best results are obtained if the kernel sizes are chosen to match the size of the input characters and the stroke thickness of the input characters. Often, the character size will be known a priori. If it is not, well-known methods for automatic size measurement are readily employed. For example, detectors are available for finding black lines in a white background. We have used a neural-net-based detector of this kind to find the position of address blocks in postal items, and have found that it gives a reliable response even for noisy images. This detector is described in H.P. Graf and E. Cosatto, "Address Block Location with a Neural Net System," *Neural Information Processing Systems* 6, Morgan Kaufmann, San Francisco (1994), pp. 785–792.

Figure 6:
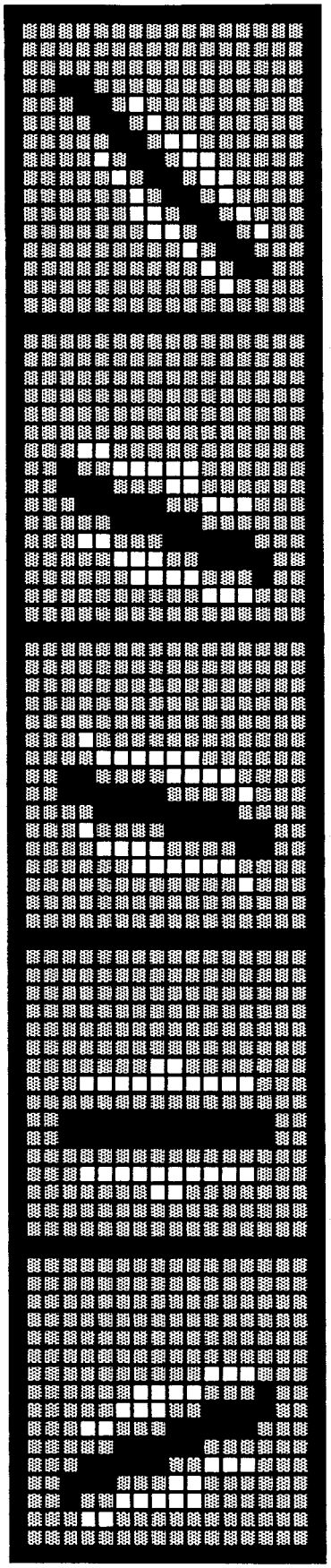
FIG. 6 is a collection of convolution kernels useful for measuring line thickness and line orientation.

Similarly, since kernels for strokes of different sizes are typically used, a measure of the stroke thickness is obtained by analyzing the response of the stroke detectors of different thickness. An exemplary set of kernels that we have used for this purpose is depicted in FIG. 6.

Our image-cleaning method can be implemented in numerous ways, using both general-purpose and special-purpose processors. However, we have found that if a relatively high speed is desired, i.e., more than one image per second, it is preferable to use a special-purpose processor. It should be noted, in particular, that the algorithms involved are easily parallelized, and thus parallel hardware can be used to great advantage.

We have implemented our image-cleaning method using neural net chips. Our processor is the NET32K board system, described in Graf et al., *Neural Information Processing Systems* 6, cited above, and in H. P. Graf et al., "Image Recognition with an Analog Neural Net Chip," *Proc. 11th IAPR* 4 (1992) 11–14. The NET32K chip is described, for example, in H. P. Graf et al., "A Reconfigurable CMOS Neural Network," *Digest IEEE Int. Solid State Circuits Conf.* (1990) 144, and in H. P. Graf et al., "Reconfigurable Neural Net Chip with 32K Connections,"*Neural Information Processing Systems* 3, J. E. Moody and D. S. Touretzky, Eds., Morgan Kaufmann, San Mateo, Calif. (1991) 1032–1038. Some applications of convolution techniques for image processing using the NET32K board system are described in E. Cosatto and H. P. Graf, "NET32K High Speed Image Understanding System," *Proc. Fourth International Conference on Microelectronics for Neural Networks and Fuzzy Systems*, Sept. 26–28, 1994, IEEE Computer Society Press, Los Alamitos, Calif. (1994) 413–421. All of these publications are hereby incorporated by reference.

Briefly, the NET32K board system comprises two NET32K neural net chips integrated on a single circuit board with a sequencer and data-formatting circuits. Control of the whole system is provided by a board containing a SPARC2 processor plus 64 Mbytes of memory. The SPARC2 board performs image buffering. When an image is received, it is sent to the NET32K processor. The feature maps are produced by the NET32K processor and returned to the SPARC2 processor.

EXAMPLES OF APPLICATIONS OF THE INVENTIVE TECHNIQUE

Example I

The inventive convolution technique is useful in many different image analysis problems. As an illustration, we present here two different applications in more detail: cleaning of noise in images of postal addresses and removing lines in images of bills.

In the first example, we used binary kernels; i.e. the pixel values are +1, −1. The four kernels used for this operation are included in FIG. 3. Although, typically, several sets of such kernels are used to cover different sizes of characters, for the example shown here four kernels sufficed.

The image is binary, with white represented as −1 and black as +1. Hence, when the kernel is overlaid onto the image, the following results are obtained:

| image bit | kernel | result contribution |
|---|---|---|
| −1 | −1 | 1 (match) |
| −1 | 1 | −1 (no match) |
| 1 | −1 | −1 (no match) |
| 1 | 1 | 1 (match) |

The kernels are designed to respond strongly to the strokes of machine-printed characters. The results of the convolutions are thresholded. This operation produces binary feature maps in which pixels mark the presence of features. The four feature maps that respectively result from the four kernels are combined with logical OR operations; that is, whenever a pixel in one of the four feature maps is turned on, the pixel in the combined feature map is turned on (in this example, such a pixel is set to the color black). This combined feature map often represents a considerable improvement over the original image. In particular, when the text is so lightly printed that the strokes of the characters are only partially present, the strokes that appear in the combined feature map may actually be more continuous than those in the raw image. As a consequence, the recognition accuracy of an OCR system can be improved by using these combined feature maps as input. This is an example of the use of this technique to perform constructive repair of characters having missing parts.

Figure 7:
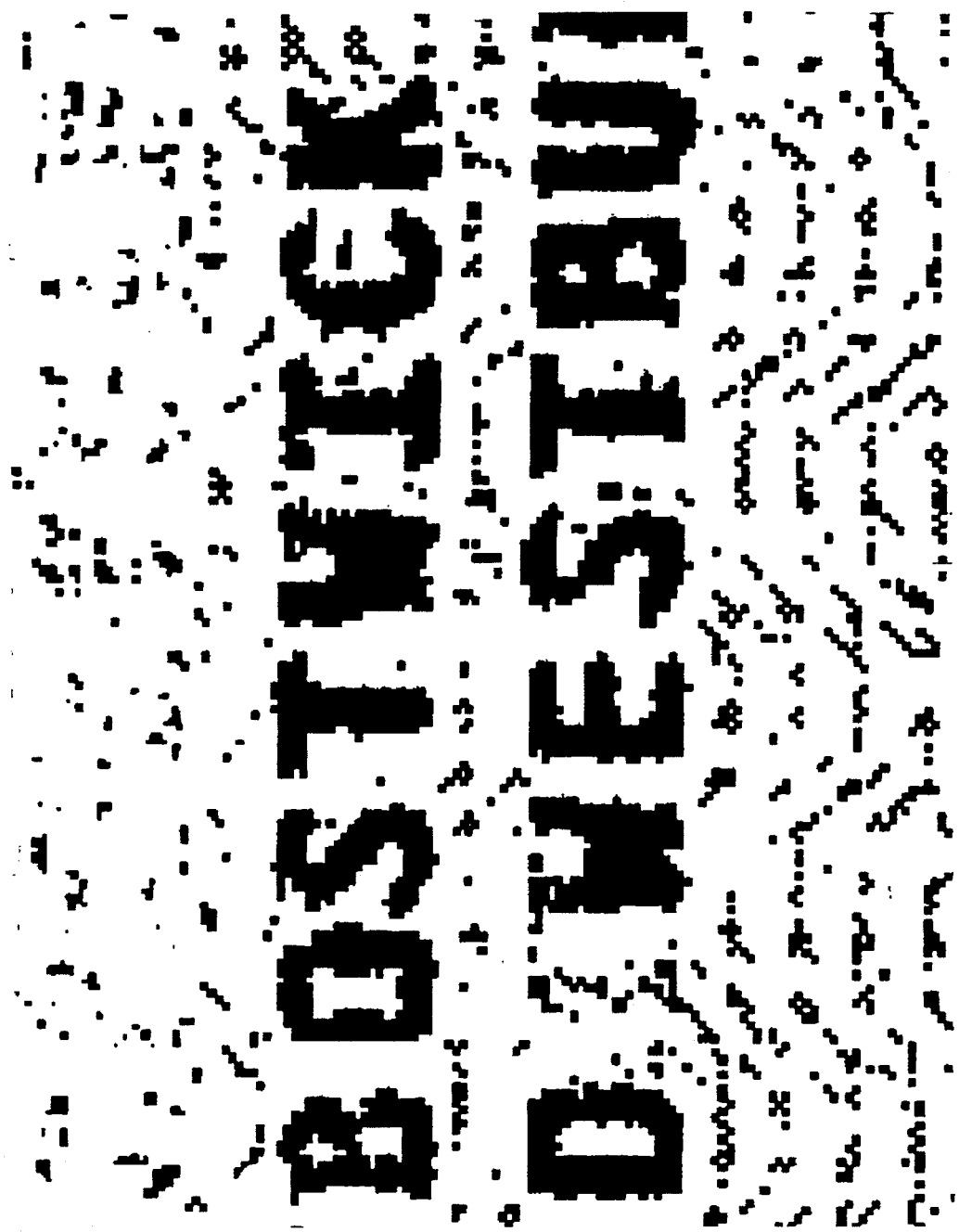
FIG. 7 is an example of a graphical image having a noisy background.
Figure 8:
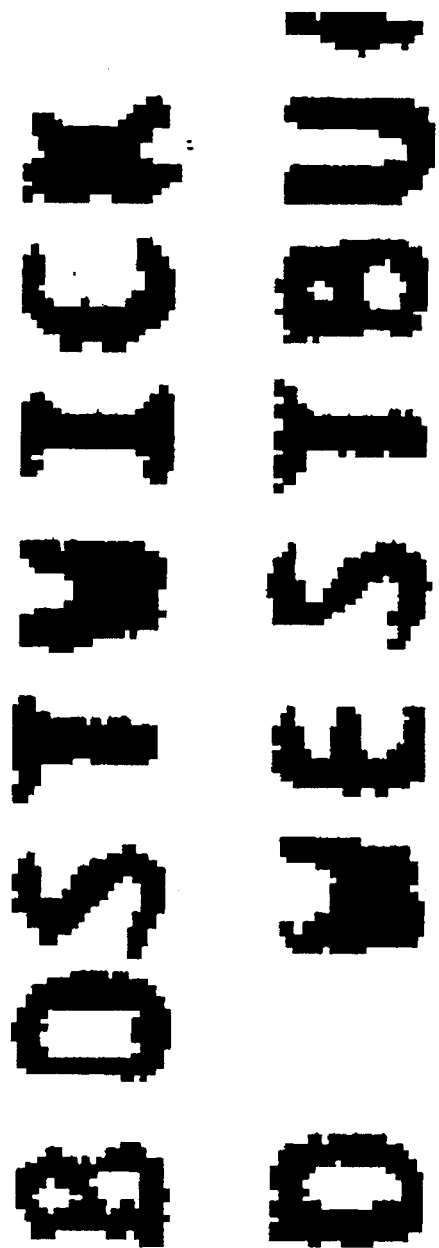
FIG. 8 is a cleaned image derived from the image of FIG. 7 by an application of the inventive method in one embodiment.

Often, the best result is obtained when the combined feature map is overlaid onto the original image, using a logical AND function. According to this logical operation, a pixel of the resulting image is set black only if it is black in both the original image and the combined feature map. FIG. 8 depicts a cleaned image that is obtained by applying this technique to the image of FIG. 7. It is evident from FIG. 8 that the background noise is eliminated completely, whereas the characters remain in the image.

Example II

Here, our technique is used to remove lines from a table of text, exemplified by a telephone bill. The problem encountered by an OCR system, in this context, is that the lines are touching the characters. This makes segmentation of the text into individual characters very unreliable.

Figure 9:
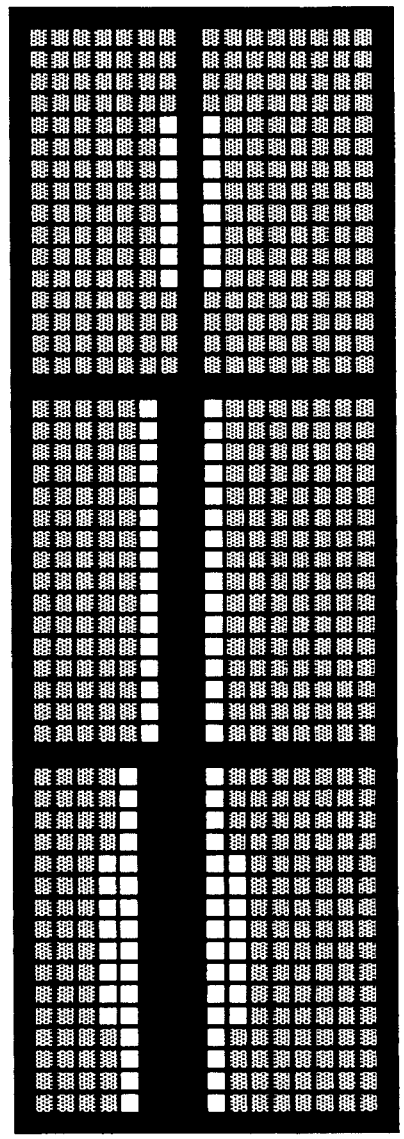
FIG. 9 is a collection of convolution kernels useful for identifying horizontal lines. In the FIG., black pixels have the value +1, white pixels have the value −1, and gray pixels are "don't care" pixels, having the value 0.

At least two, an preferably three, of the kernels shown in FIG. 9 are used to identify the horizontal lines. It is evident from the FIG. that each of these kernels produces a maximum response (as a result of convolution) to horizontal lines of a different thickness.

In this case, ternary-valued kernels are used. That is, each pixel can take one of three values: +1, −1, or 0. (The 0 value signifies a "don't care" pixel.) The pixels in the image, however, take binary values, with, e.g., white represented as −1 and black as +1. The logical function performed between kernel bits and image bits is given by the following table:

| image bit | kernel | result contribution |
|---|---|---|
| −1 | −1 | 1 (match) |
| −1 | 0 | 0 (don't care) |
| −1 | 1 | −1 (no match) |
| 1 | −1 | −1 (no match) |
| 1 | 0 | 0 (don't care) |
| 1 | 1 | 1 (match) |

Figure 11:
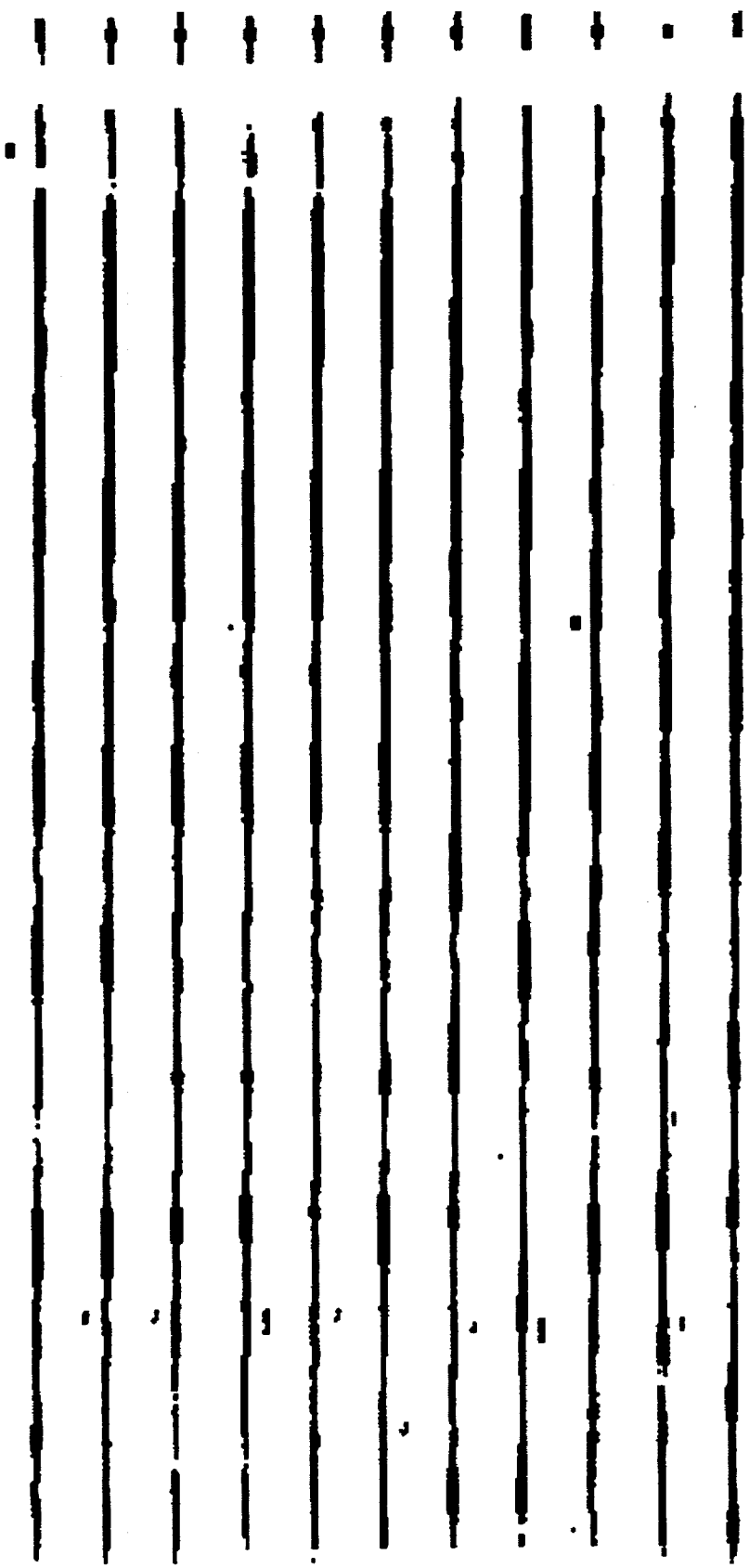
FIG. 11 is a template derived from the image of FIG. 10 and the kernels of FIG. 9.

We applied the three kernels of FIG. 9 to the raw image of FIG. 10 in the manner described above. The three resulting feature maps were combined as in Example I hereinabove. The result is depicted in FIG. 11. It is apparent that the image of FIG. 11 contains only lines, and no text. The horizontal lines are readily subtracted from the raw image by overlaying onto it the image of FIG. 11, with black pixels reversed to white. FIG. 12 depicts the result of this operation.

In an alternative method for removing the horizontal lines, a connected component analysis is used to translate the feature map into blobs of connected components. Using standard techniques, the end points of the horizontal lines are readily identified in this manner. The horizontal lines are then readily redrawn in white pixels, which are then overlayer onto the raw image as described above.

We claim:

1. A method of image enhancement, comprising:
   a) providing a raw image comprising an array of pixels;
   b) providing a library of kernels, each kernel comprising an array of pixels adapted to cause, in a suitable convolution operation, a selective response to a particular primitive feature that may be present in the raw image;
   c) selecting at least a first and a second kernel from the kernel library, such that each of said first and second kernels represents a line segment having a distinct orientation and a length and thickness known to occur, at least approximately, in portions of the raw image that are to be enhanced;
   d) separately convolving the raw image with each of the selected kernels, each convolution operation leading to a respective feature map as the product of that convolution operation followed by a thresholding procedure; wherein: said thresholding procedure assigns to each pixel of the feature map a non-zero value only if the product of the convolution operation has a corresponding pixel value exceeding a threshold Θ, and Θ is chosen such that undesired portions of the raw image are suppressed relative to desired portions of the raw image; and
   e) adding together at least two of the feature maps, leading to a template as the product of the addition operation.

2. The method of claim 1, further comprising, before the adding step, the step of binarizing the feature maps.

3. The method of claim 2, wherein the addition operation of the adding step is a logical OR operation.

4. The method of claim 1, wherein the library of kernels comprises at least one kernel corresponding to a line segment of each of the orientations: 0 degrees, +45 degrees, 90 degrees, and −45 degrees relative to the horizontal.

5. The method of claim 4, wherein: the library of kernels comprises a respective group of four kernels corresponding to each of said orientations, and the four kernels of each said group correspond to four different, respective sizes of line segment.

6. A method of image enhancement, comprising:
a) providing a raw image comprising an array of pixels;
b) providing a library of kernels, each kernel comprising an array of pixels adapted to cause, in a suitable convolution operation, a selective response to a particular primitive feature that may be present in the raw image;
c) selecting at least two kernels from the kernel library, each selected kernel representing a distinct primitive feature;
d) separately convolving the raw image with each of the selected kernels, each convolution operation leading to a respective feature map as the product of that convolution operation; and
e) adding together at least two of the feature maps, leading to a template as the product of the addition operation; and
f) multiplying the raw image by the template, leading to a corrected image as the product of the multiplication operation.

7. The method of claim 6, wherein the multiplication operation of the multiplying step is a logical AND operation.

8. The method of claim 6, further comprising, before the adding step, the step of binarizing the feature maps.

9. The method of claim 8, wherein the addition operation of the adding step is a logical OR operation.

10. A method of image enhancement, comprising:
a) providing a raw image comprising an array of pixels;
b) providing a library of kernels, each kernel comprising an array of pixels adapted to cause, in a suitable convolution operation, a selective response to a particular primitive feature that may be present in the raw image;
c) selecting at least two kernels from the kernel library, each selected kernel representing a distinct primitive feature;
d) separately convolving the raw image with each of the selected kernels, each convolution operation leading to a respective feature map as the product of that convolution operation; and
e) adding together at least two of the feature maps, leading to a template as the product of the addition operation, said template having at least some binary pixel values;
f) inverting the binary pixel values of the template; and
g) multiplying the raw image by the template in a logical AND operation.

11. A method for sorting mail, comprising:
a) scanning the address area of at least one postal item to create a raw, binary, pixel image;
b) separately convolving the raw image with each of a set of at least four kernels, each kernel comprising an array of pixels adapted to cause, in the convolution operation, a selective response to a distinct primitive feature characteristic of post addresses, each respective convolution operation resulting in a respective feature map, as the product of that convolution operation followed by a thresholding procedure, wherein: at least two of said kernels represent respective line segments having distinct orientations and each having a length and thickness known to occur, at least approximately, in portions of the raw image that are to be enhanced; said thresholding procedure assigns to each pixel of the feature map a non-zero value only if the product of the convolution operation has a corresponding pixel value exceeding a threshold $\Theta$; and $\Theta$ is chosen such that undesired portions of the raw image are suppressed relative to desired portions of the raw image;
c) adding the feature maps together, leading to a template as the product of the addition operation; and
d) applying the template as input to a system for automatic character recognition.

12. The method of claim 11, further comprising, before the adding step, the step of binarizing the feature maps.

13. The method of claim 12, wherein the addition operation of the adding step is a logical OR operation.

14. The method of claim 11, wherein the set of kernels comprises at least one kernel corresponding to a line segment of each of the orientations: 0 degrees, +45 degrees, 90 degrees, and −45 degrees relative to the horizontal.

15. A method for sorting mail, comprising:
a) scanning the address area of at least one postal item to create a raw, binary, pixel image;
b) separately convolving the raw image with each of a set of at least four kernels, each kernel comprising an array of pixels adapted to cause, in the convolution operation, a selective response to a distinct primitive feature characteristic of postal adresses, each respective convolution operation resulting in a respective feature map;
c) adding the feature maps together, leading to a template as the product of the addition operation;
d) multiplying the template by the raw image in a logical AND operation to produce a corrected image as the product of the multiplication operation; and
e) applying the corrected image as input to a system for automatic character recognition.

16. The method of claim 15, further comprising, before the adding step, the step of binarizing the feature maps.

17. The method of claim 16, wherein the addition operation of the adding step is a logical OR operation.

18. The method of claim 15, wherein the set of kernels comprises at least one kernel corresponding to a line segment of each of the orientations: 0 degrees, +45 degrees, 90 degrees, and −45 degrees relative to the horizontal.

19. Apparatus for enhancing two-dimensional images, comprising:
a) means for receiving a raw pixel image;
b) a library of kernels, each kernel comprising an array of pixels adapted to cause, in a suitable convolution operation, a selective response to a particular primitive feature that may be present in the raw image;
c) means for convolving the raw image with each of at least two kernels selected from the kernel library, and for storing a respective feature map that results from the convolution with each said selected kernel;
d) means for adding at least two of said feature maps together, leading to a template as the result of the addition operation; and
e) means for multiplying the raw image by the template, leading to a corrected image as the result of the multiplication operation.

20. Apparatus of claim 19, further comprising means for inputting the corrected image to a system for automatic character recognition.

21. A method for removing horizontal lines from a table, comprising:
a) providing a raw image of the table, the raw image comprising an army of pixels;
b) providing a set of at least two kernels, each kernel comprising an array of pixels adapted to cause, in a suitable convolution operation, a selective response to horizontal lines of the raw image having a distinct, respective thickness;

c) separately convolving the raw image with each of said kernels, each convolution operation leading to a respective feature map as the product of that convolution operation;

d) binarizing the feature maps;

e) adding together the feature maps in a logical OR operation, leading to a template as the product of the addition operation, the template comprising an array of pixels having binary values;

f) inverting the binary pixel values of the template; and g) multiplying the raw image by the template in a logical AND operation.

* * * * *